UNITED STATES PATENT OFFICE.

HULDAH ECKERT, OF LODI, WISCONSIN.

IMPROVEMENT IN THE MANUFACTURE OF VINGEGAR.

Specification forming part of Letters Patent No. 51,159, dated November 28, 1865.

*To all whom it may concern:*

Be it known that I, HULDAH ECKERT, of the town of Lodi, county of Columbia and State of Wisconsin, have invented a new and Improved Method of Making Vinegar; and I do hereby declare that the following is a full and exact description thereof.

To four (4) gallons of water in which peeled potatoes have been boiled for family use, when well settled, add one (1) quart of molasses or one and a half (1½) pounds of sugar. Keep in a warm place for three or four weeks, when it will be fit for use, thus putting it within the reach of every family to supply themselves with this very necessary article, and at the small cost of six cents per gallon, whereas the price now paid for vinegar is from fifty to sixty cents per gallon.

What I claim as being my invention, and desire to secure by Letters Patent, is—

Converting water in which potatoes have been boiled into vinegar, substantially as described.

Dated at Lodi, Wisconsin, this 3d day of October, 1865.

HULDAH ECKERT.

In presence of—
    S. S. DUNNING,
    JOHN J. ECKERT.